(12) United States Patent
Seok et al.

(10) Patent No.: US 11,601,885 B2
(45) Date of Patent: *Mar. 7, 2023

(54) CHANNEL ACCESS FOR MULTI-USER (MU) WAKE-UP SIGNAL TRANSMISSION BY USING FDMA SCHEME

(71) Applicant: MediaTek Singapore Pte. Ltd., Sg (SG)

(72) Inventors: Yongho Seok, San Jose, CA (US); Jianhan Liu, San Jose, CA (US); James Chih-Shi Yee, San Jose, CA (US); Thomas Edward Pare, Jr., San Jose, CA (US)

(73) Assignee: MEDIATEK SINGAPORE PTE. LTD, Singapore (SG)

( * ) Notice: Subject to any disclaimer, the term of this patent is extended or adjusted under 35 U.S.C. 154(b) by 139 days.

This patent is subject to a terminal disclaimer.

(21) Appl. No.: 17/238,008

(22) Filed: Apr. 22, 2021

(65) Prior Publication Data

US 2021/0243693 A1 Aug. 5, 2021

Related U.S. Application Data

(63) Continuation of application No. 16/357,977, filed on Mar. 19, 2019, now Pat. No. 11,019,568.

(Continued)

(51) Int. Cl.
*H04W 52/02* (2009.01)
*H04L 5/00* (2006.01)
(Continued)

(52) U.S. Cl.
CPC ......... *H04W 52/0229* (2013.01); *H04L 5/005* (2013.01); *H04W 52/0219* (2013.01); *H04W 72/0453* (2013.01); *H04W 76/28* (2018.02)

(58) Field of Classification Search
CPC ............ H04W 52/0229; H04W 76/28; H04W 52/0219; H04W 72/0453; H04W 74/0808;
(Continued)

(56) References Cited

U.S. PATENT DOCUMENTS 10,231,251 B2 * 3/2019 Wang ................ H04W 72/0453
2012/0069893 A1 * 3/2012 Shirakata ............ H04L 25/0262
375/239

(Continued)

FOREIGN PATENT DOCUMENTS

WO 2018048202 A1 3/2018
WO 20180388532 A1 3/2018

*Primary Examiner* — Ayaz R Sheikh
*Assistant Examiner* — Louis Samara

(57) ABSTRACT

Systems and methods of transmitting a multi-user (MU) wake-up packet in FDMA. In the wake-up setup stage, an STA informs the AP that it can resolve an MU wake-up packet transmitted in FDMA. Accordingly, AP allocates a frequency channel to the STA in a WUR setup response frame which indicates a channel offset relative to the primary channel. Moreover, if a WUR channel allocated to an STA is inaccessible or there is on pending wake-up signal for the STA, no wake-up signal is included in the MU wake-up packet while any other accessible allocated channels may still be utilized for transmitting the scheduled wake-up signals. During such a transmission, an inaccessible channel may be punctured; and an accessible channel having no pending wake-up signal may be used to carry an invalid wake-up signal or a legacy preamble followed with no wake-up signal.

20 Claims, 13 Drawing Sheets

Related U.S. Application Data

(60) Provisional application No. 62/661,660, filed on Apr. 24, 2018, provisional application No. 62/645,871, filed on Mar. 21, 2018.

(51) Int. Cl.
*H04W 72/0453* (2023.01)
*H04W 76/28* (2018.01)

(58) Field of Classification Search
CPC ......... H04W 52/0216; H04W 52/0235; H04W 48/10; H04L 5/005; H04L 27/2603; H04L 25/0262
See application file for complete search history.

(56) References Cited

U.S. PATENT DOCUMENTS

| | | |
|---|---|---|
| 2014/0142721 A1 | 5/2014 | Robertson et al. |
| 2016/0006634 A1 | 1/2016 | Li et al. |
| 2016/0066349 A1* | 3/2016 | Seok ................. H04W 74/0808 370/338 |
| 2017/0163385 A1* | 6/2017 | Merlin ................. H04L 1/1685 |
| 2018/0020410 A1* | 1/2018 | Park ................. H04W 52/0235 |
| 2018/0041961 A1* | 2/2018 | Huang .............. H04W 52/0216 |
| 2018/0049131 A1* | 2/2018 | Huang .............. H04W 52/0235 |
| 2018/0288706 A1* | 10/2018 | Fang ................... H04L 27/2603 |
| 2019/0261273 A1* | 8/2019 | Kim ..................... H04W 48/10 |
| 2019/0289549 A1* | 9/2019 | Lim ................. H04W 52/0219 |

\* cited by examiner

CHANNEL ACCESS FOR MULTI-USER (MU) WAKE-UP SIGNAL TRANSMISSION BY USING FDMA SCHEME

CROSS-REFERENCE TO RELATED APPLICATIONS

This application claims the benefit of and priority to and is a continuation of copending U.S. patent application Ser. No. 16/357,977, entitled "CHANNEL ACCESS FOR MULTI-USER (MU) WAKE-UP SIGNAL TRANSMISSION BY USING FDMA SCHEME," with filing date Mar. 19, 2019, which claims priority to U.S. Provisional Patent Application No. 62/645,871, entitled "CHANNEL ACCESS PROCEDURE FOR WUR FDMA TRANSMISSION," filed on Mar. 21, 2018; and U.S. Provisional Patent Application No. 62/661,660, entitled "CHANNEL ACCESS PROCEDURE FOR WUR FDMA TRANSMISSION," filed on Apr. 24, 2018. The entire contents of the foregoing patent applications are herein incorporated by reference for all purposes.

TECHNICAL FIELD

Embodiments of the present disclosure relate generally to the field of network communication, and more specifically, to the field of communication protocols in wireless communication for wake-up radios.

BACKGROUND OF THE INVENTION

Wireless local area networks (WLANs) and mobile communication devices have become increasingly ubiquitous, such as smart phones, wearable devices, various sensors, Internet of Things (IoTs), etc. With its overall size constrained by portability requirements, such a communication device typically is powered by a built-in battery of limited charging capacity. Most workloads of a communication device can be communication-driven and therefore the wireless radio is a major power consumption source as it needs to remain operational to ensure prompt responses to data communication requests.

To reduce power consumption by the wireless radios, some communication devices include a main radio and a low-power wake-up radio (WUR). When it is not involved in data communication tasks, the main radio can be placed into a power conservation state, e.g., a sleeping mode or even turned off. On the other hand, the low-power wake-up radio (WUR) remains active and operates to activate the main radio whenever the WUR receives a data communication request that is directed to the main radio. For example, the request carried in a wake-up signal transmitted from a WI-FI access point (AP).

Compared with a main radio with high rate data communication capabilities and complex processing functions, a WUR is a low-cost and low power consumption radio and yet suffices to receive and process a wake-up signal and accordingly activate the main radio. For example, the nominal power consumption of a WUR can be 0.5-1 mW or even less.

The Institute for Electronic and Electrical Engineers (IEEE) 802.11 family specifies technical standards for WLANs. The latest generations of IEEE 802.11 standards adopt multi-user (MU) communication schemes, such as Multi-User Multiple-Input Multiple-Output (MU-MIMO) and Orthogonal Frequency-Division Multiple Access (OFDMA). It is desirable to develop FDMA transmission mechanisms that enable simultaneous wake-up signal communication between a transmitter and multiple WUR receivers. Waking up multiple stations simultaneously can advantageously facilitate following OFDMA data transmission.

Conventionally, in transmitting an MU packet, the frequency channels utilized in the transmission have to be contiguous. Thus, if a certain non-primary channel is inaccessible or otherwise unused, some other channels cannot be used as well even thought they are available and have scheduled transmission tasks. This undesirably limits the channel usage efficiency and impedes the related OFDMA data transmission.

SUMMARY OF THE INVENTION

Accordingly, systems and methods disclosed herein provide protocols for wake-up signal communication that can improve usage efficiency of frequency channels in transmitting a multi-user (MU) wake-up packet (or "WUR packet" herein) to multiple communication devices in a wireless local area network (WLAN).

Embodiments of the present disclosure use the Frequency-Division Multiple Access (FDMA) scheme to transmit an MU WUR packet, for which each station (STA) informs an access point (AP) its capability of receiving an FDMA MU WUR packet. All accessible frequency channels can be efficiently used in the FDMA transmission by virtue of channel puncture on the inaccessible channels or carrying dummy signals in the frequency channels that have no pending wake-up signals. Particularly, in the wake-up setup stage, an STA negotiates with the AP regarding wake-up signal communication and informs the AP its capability of resolving a MU WUR packet transmitted in FDMA. Particularly, the STA indicates whether it is configured to receive a WUR beacon and an MU WUR frame that are transmitted in the same channel or in different channels. To multiple STAs that indicate the latter, the AP broadcasts a beacon frame about the WUR operating class and WUR channels to be used for transmitting a subsequent wake-up frame. The AP also individually sends a WUR setup response frame to an STA with an indication of a channel offset with reference to the primary channel.

In some embodiments of punctured FMDA MU wake-up operations, when a WUR channel allocated to an STA is busy (or otherwise inaccessible) or there is no pending wake-up signal for the STA (or the channel has "no task"), the AP can transmit an MU WUR packet enclosing wake-up signals in all idle channels. That is, noncontiguous frequency channels are used for transmission with the busy channels or no-task channels being excluded. However, the WUR packet contains no wake-up signal destined to the STA and no signal is transmitted in the busy WUR channel.

In some other embodiments, when there is no pending wake-up signal for the STA, the AP can transmit an MU WUR packet enclosing only a legacy preamble, but no wake-up signal, destined to the STA, along with the preambles and wake-up signals destined to other STAs. In still some other embodiments, when there is no pending wake-up signal for the STA, the AP can transmit an MU WUR packet enclosing a legacy preamble followed by an invalid wake-up signal, destined to the STA, along with the preambles and wake-up signals destined to other STAs.

According to embodiments of the present disclosure, by puncturing, or filling dummy signals on, the busy or no-task channels, all other frequency channels can be efficiently used in the FDMA MU WUR packet transmission, including the channels located further from the primary channel than the busy or no-task channels. As a result, the frequency channel usage efficiency can be significantly improved.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
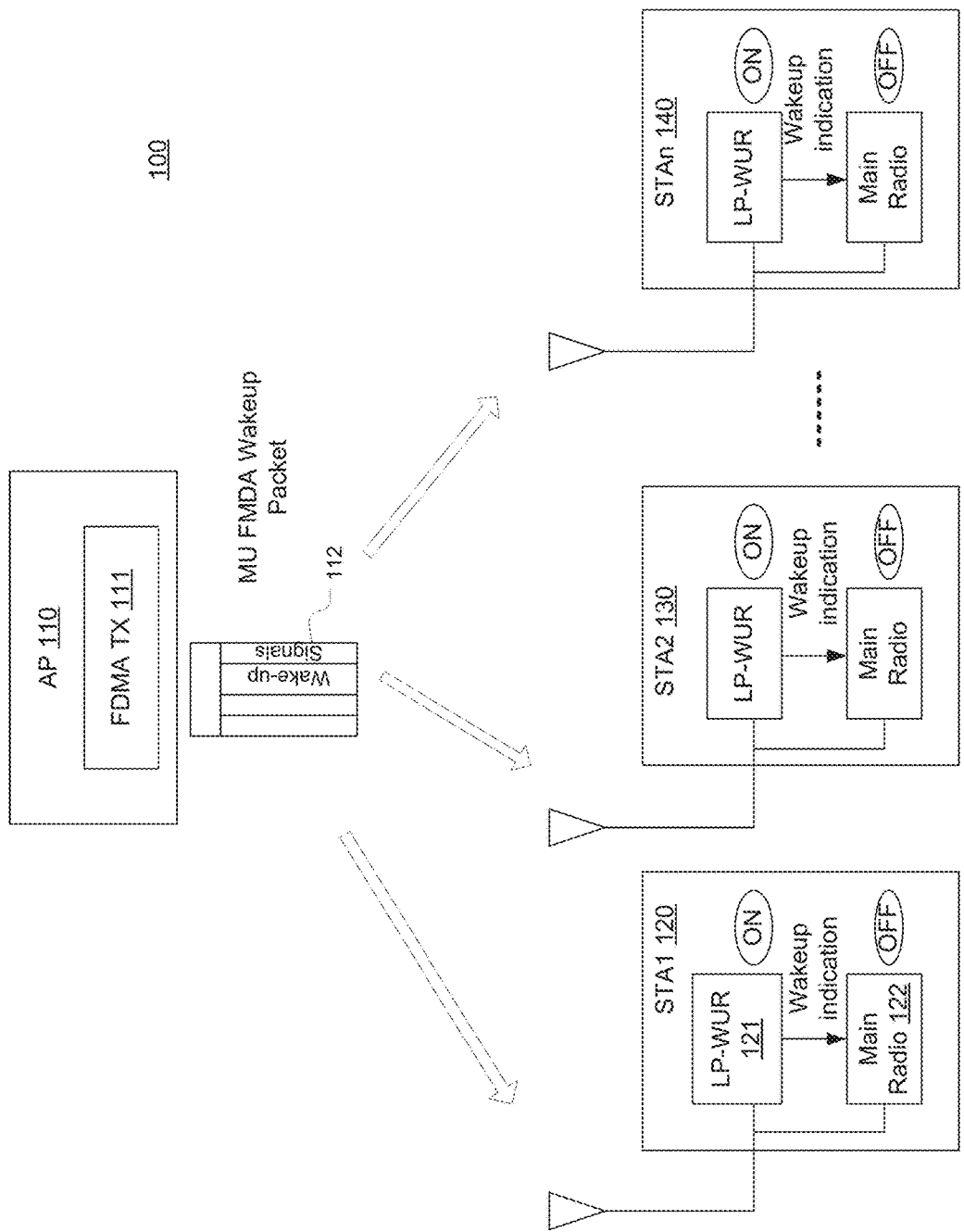
FIG. 1 illustrates an exemplary WLAN in which an AP can transmit an MU wake-up packet in FDMA to wake up the main radios of multiple non-AP STAs in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Channel Access for Multi-User (MU) Wake-Up Signal Transmission by Using FDMA Scheme Embodiments of the present disclosure are described in detail with reference to the Physical Layer Convergence Protocol (PLCP) protocol data unit (PPDU) structures as defined in the high efficiency (HE) WLAN based IEEE 802.11 family of Specifications and Standards. However, the present disclosure is not limited to any specific packet or frame formats or structures, nor limited to any specific industry standards or specifications.

The communication devices according to embodiments of the present disclosure may have main radios configured to use one or more wireless communication technologies, such as Bluetooth®, WI-FI and/or cellular technologies, e.g., LTE, 4G, 5G, etc.

Overall, embodiments of the present disclosure provide communication protocols for Frequency-Division Multiple Access (FDMA) multi-user (MU) wake-up signal communications. In the wake-up setup stage, an STA may negotiate with the access point (AP) regarding various aspects of the wake-up signal communication, and particularly, inform the AP that it can resolve an MU WUR packet transmitted in FDMA. Accordingly, AP allocates a frequency channel (containing a WUR channel) to the STA in a WUR setup response frame which indicates a channel offset relative to a primary channel of the WUR. Moreover, if a WUR channel allocated to an STA is inaccessible or there is no pending wake-up signal for the STA, no wake-up signal is included on the WUR channel allocated to the STA while all other allocated channels may still be utilized for transmitting the scheduled wake-up signals. During such a transmission, an inaccessible channel may be punctured; and an accessible channel having no pending wake-up signal may be used to carry an invalid wake-up signal or a legacy preamble followed with no wake-up signal.

FIG. 1 illustrates an exemplary WLAN 100 in which an AP can transmit an MU wake-up packet 110 in FDMA to wake up the main radios of multiple non-AP STAs in accordance with an embodiment of the present disclosure. The AP 110 and the STAs 120, 130 and 140 may belong to one Basic Service Set (BSS). Each of the STAs 120, 130 and 140 has a main radio and a low power WUR (LP-WUR). For example for power preservation, the main radio 122 in STA 120 can be powered off or placed in a sleeping state or otherwise an inactive state. In such a state, the main radio 122 is unable to receive or transmit packets. While the main radio is in the inactive state, the WUR 121 remains active and can receive a wake-up signal transmitted from another device, e.g., the AP 110. The WUR 121 operates to switch the main radio back to an active state responsive to a received wake-up signal.

According to embodiments of the present disclosure, STAs can inform the AP if they have the channel switching capability of participating in an FDMA MU wake up operation. More specifically, an STA indicates whether it is configured to receive WUR beacons and wake-up frames transmitted in different channels. For an STA with such capability, the AP sends a WUR setup response which indicates a WUR channel allocated to the STA. The WUR channel may be indicated in a representation of an offset from a primary channel of the WUR.

It will be appreciated that a particular WUR channel can be allocated to an STA through a negotiation and/or training process between the STA and the AP. A negotiation process may be performed by the main radio on the STA while it is in an active state or by the WUR itself. Wake-up signals for a specific STA are fixed at the negotiated WUR channel which can be changed through a new negotiation and/or training process according to a specific negotiation protocol.

The AP 110 can then generate an MU wake-up packet 111 enclosing the wake-up signals for multiple intended STAs having the channel switching capability. In some embodiments, each wake-up signal may be modulated using On-off keying (OOK) modulation in the allocated WUR channel. By using an MU WUR packet, more than one STA can receive wake-up signals at the same time and respectively process their own wake-up signals independently and simultaneously. From the AP's perspective, this can advantageously and significantly decrease the number of channel accesses to the AP and reduce the latency to wake up multiple STAs.

A WUR (e.g., LP-WUR 121) receiving the MU wake-up packet can determine whether the packet contains a wake-up signal intended for the instant STA based on whether the carrier wave in the anticipated WUR channel is present.

In some embodiments, a WUR itself may have a sleep protocol. For example, a duty cycle is defined for the WUR which allows it to periodically stay awake for a certain window of time ("WUR awake window") followed by a sleep window ("WUR sleep window"). The AP may transmit wake-up frames to the STA during a WUR awake window. The awake window duration can be determined based on the transmission duration of a wake-up signal, the number of STAs having WURs in the BSS, and the power consumption requirements of the WUR. The WUR sleep protocol can be determined through a negation or coordination process with the AP.

Before generation of an MU wake-up packet, the AP may receive an indication that certain allocated WUR channels are busy or may determine that no wake-up signal is pending for a certain STA, e.g., according to its duty cycle. According to embodiments of the present disclosure, in such a case, the AP can transmit an MU WUR packet enclosing wake-up signals on all idle channels while the busy or no-task channels are not used. However, the WUR packet contains no wake-up signal destined to the STA. In some other embodiments, when there is no pending wake-up signal for the STA, the AP can transmit an MU WUR packet enclosing only a legacy preamble, but no wake-up signal, destined to the STA, along with the preambles and wake-up signals destined to other STAs. In still some other embodiments, when there is no pending wake-up signal for the STA, the AP can transmit an MU WUR packet enclosing a legacy preamble followed by an invalid wake-up signal, destined to the STA, along with the preambles and wake-up signals destined to other STAs.

By puncturing, or filling invalid wake-up signals on the busy or no-task channels, all available frequency channels can be advantageously and efficiently used in the FDMA MU WUR packet transmission, including the channels located further from the primary channel than the busy or no-task channels. As a result, the frequency channel usage efficiency can be significantly improved.

Figure 2:
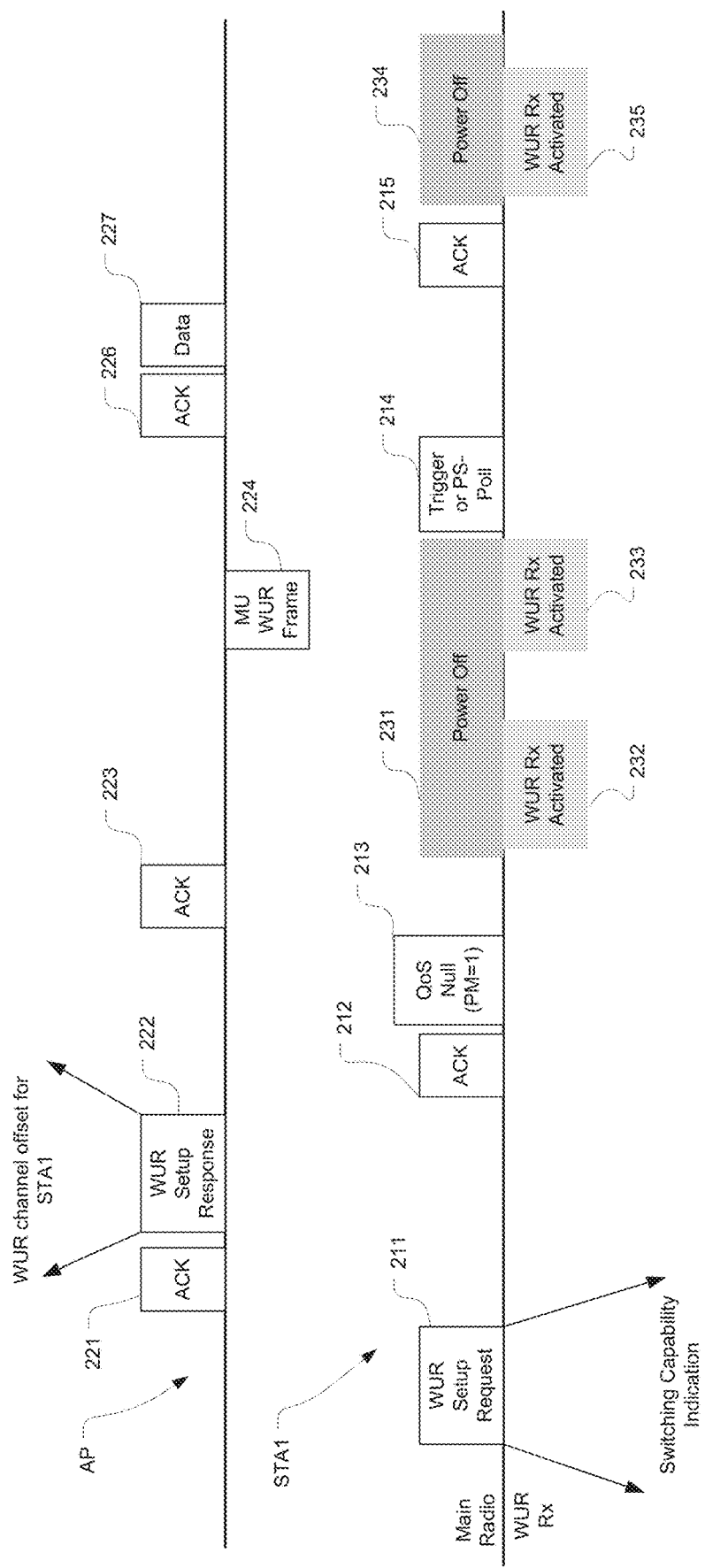
FIG. 2 shows timing diagrams illustrating an exemplary communication process between an AP and an STA in an FDMA MU WUR operation in accordance with an embodiment of the present disclosure.

FIG. 2 shows timing diagrams illustrating an exemplary communication process between an AP and an STA in an FDMA MU WUR operation in accordance with an embodiment of the present disclosure. To enable the FDMA MU wake-up mode, the station STA1 sends a WUR setup request frame 211 to the AP, which includes an indication whether the WUR channel switching capability is enabled, e.g., whether the STA1 is capable of receiving WUR beacon frames and wake-up frames that are transmitted in different channels. WUR beacon frames are typically transmitted to multiple STAs in the same channel. In some embodiments, the switching capability indication is contained in a WUR parameters field of the WUR setup request frame. However, it will be appreciated that the discussions herein on particular formats, fields and values of certain fields are merely exemplary. The various indications and messages disclosed herein may be placed in any suitable field of a packet or frame without departing from the scope of the present disclosure.

When an AP receives a WUR setup request indicating that the STA has no channel switching capacity, the AP provides a WUR operating class and a WUR channel number for the STA to receive both WUR beacons and wake-up frames. The WUR operating class and the WUR channel number may be contained in a WUR mode element of a WUR setup response frame in compliance with the IEEE 802.11 standards and specifications.

On the other hand, when an AP receives a WUR setup request indicating that the STA has channel switching capacity, the AP uses a beacon frame to provide the WUR operating class and the WUR channel number for the STA to receive WUR beacon frames. The AP uses a WUR setup response frame to specify a WUR channel offset relative to the WUR primary channel which corresponds to a channel to be used for transmitting wake-up frames to the STA.

In one example, the WUR channel offset is encoded as follows: "0" represents the WUR primary channel; "1" represents the first upper 20 MHz channel relative to the WUR primary channel; "2" represents the first lower 20 MHz channel relative to the WUR primary channel; "3" represents the second upper 20 MHz channel relative to the WUR primary channel; "4" represents the second lower 20 MHz channel relative to the WUR primary channel; "5" represents the third upper 20 MHz channel relative to the WUR primary channel; and "6" represents the third lower 20 MHz channel relative to the WUR primary channel.

In some other embodiments, an allocated WUR channel is indicated by a combination of WUR bandwidth indication and WUR offset indication. For example, the WUR setup response frame includes an indication for the WUR bandwidth associated with the AP, e.g., indicating 40 MHz or 80 MHz. More specifically, when the WUR operating class has an indication of 40 MHz, the WUR channel offset field is set to "0" for the lower 20 MHz and set to "1" for the upper 20 MHz. When the WUR operating class has an indication of 80 MHz, the WUR channel offset field is set to "0" for the first 20 MHz, set to "1" for the second 20 MHz, set to "2" for the third 20 MHz, set to "3" for the fourth 20 MHz.

The WUR offset indications may be included in a WUR channel offset field, a WUR operating class or a WUR channel number fields of the WUR setup response frame in compliance with the IEEE 802.11 standards and specifications.

In the illustrated example, when an AP receives the WUR setup request 211 indicating that the STA has the channel switching capacity, the AP returns an acknowledgement frame (ACK) 221 and a WUR setup response frame 222. The response frame 222 specifies an allocated WUR offset as described above.

The STA1 then sends an ACK 212 and a QoS Null frame 213 to the AP and the AP returns an ACK 223. Once the WUR mode is set up, the STA transitions to the WUR mode in which the main radio is powered off (block 214) and the WUR receiver is activated periodically (block 232 and 233) according to the negotiated duty cycle to listen to WUR frames.

The AP may transmit WUR frames (e.g., 224) to the STA during the activated time of its WUR receiver. Once the STA receive s a wake-up frame addressed to itself, it may change to the awake state in the power saving mode by transmitting a trigger frame (e.g., QoS null) or a PS-Poll frame 214. In response, the AP sends an ACK 226 and starts to transmit data 227 to the main radio of the STA. After receiving the data, the STA enters the WUR mode again (block, 234 and 235).

Figure 3:
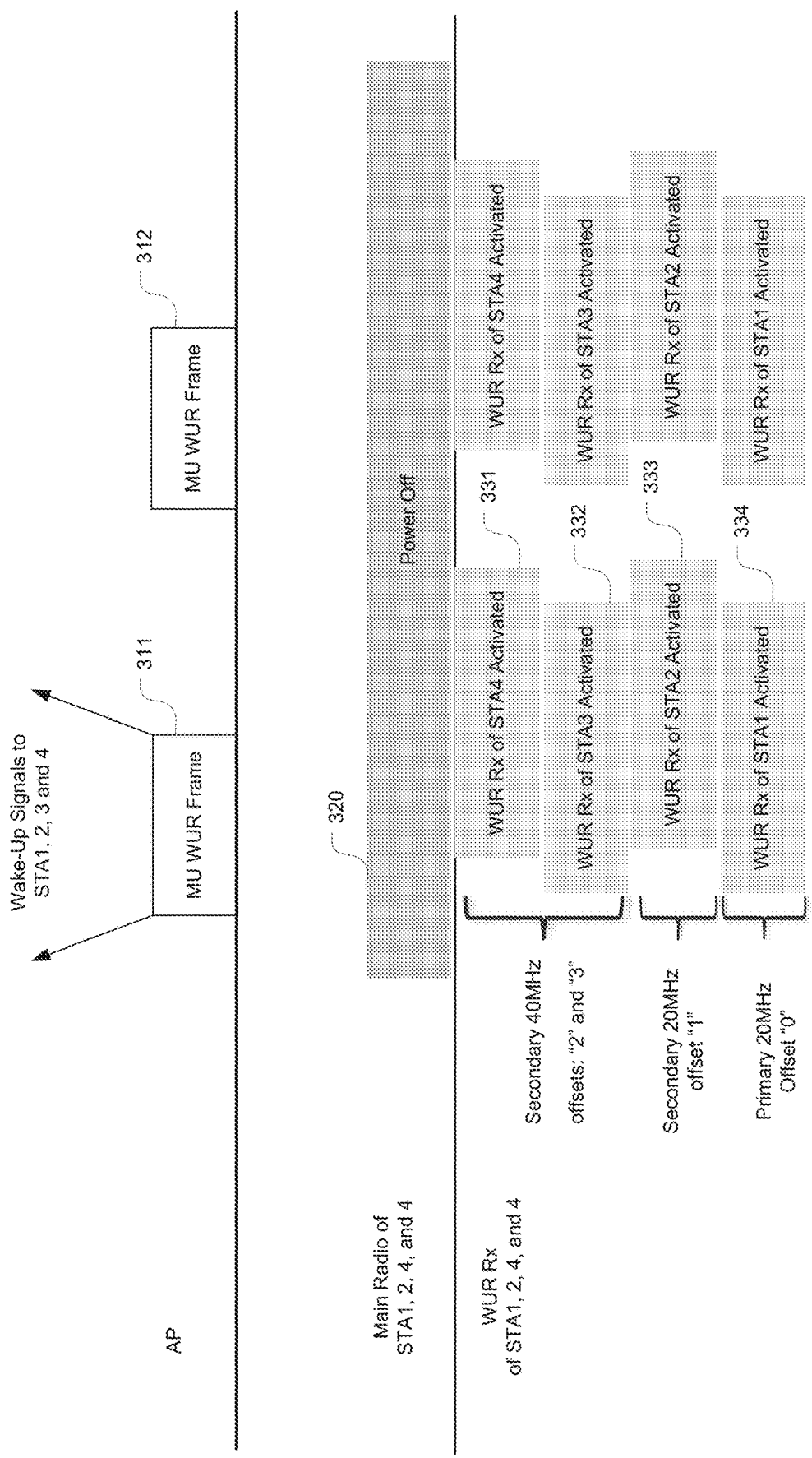
FIG. 3 shows timing diagrams illustrating exemplary channel utilization and operational states of an AP and multiple STAs in a WUR mode in accordance with an embodiment of the present disclosure.

FIG. 3 shows timing diagrams illustrating exemplary channel utilization and operational states of an AP and multiple STAs in a WUR mode in accordance with an embodiment of the present disclosure. After the WUR mode setup process is completed, the AP sends the MU WUR frames to stations STA1~STA4 periodically assuming they have the same duty cycle. During the WUR duty cycle, the main radios of the STAs remain powered off and the WUR receivers of the STAs wake up to listen in the respective allocated WUR channels.

In this example, all allocated WUR channels are accessible for the FDMA WUR frame transmissions. The STA1 WUR listens in the primary 20 MHz channel corresponding to an encoded offset "0;" the STA2 WUR listens in the secondary 20 MHz channel corresponding to an encoded offset "1," the STA3 and STA4 WURs listen on the secondary 40 MHz channel corresponding to the encoded offsets "2" and "3."

Figure 4A:
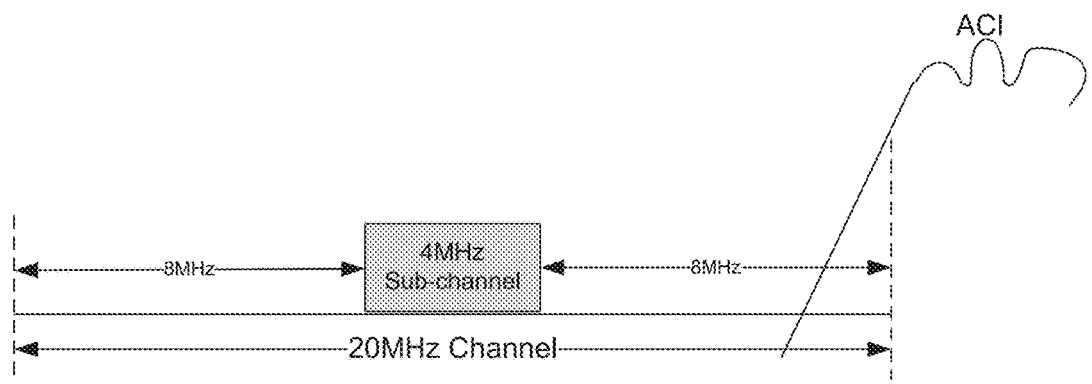
FIGS. 4A and 4B shows the one or more sub-channels (WUR channels) that can be used for Wake-up signal transmissions in a 20 MHz frequency channel.
Figure 4B:
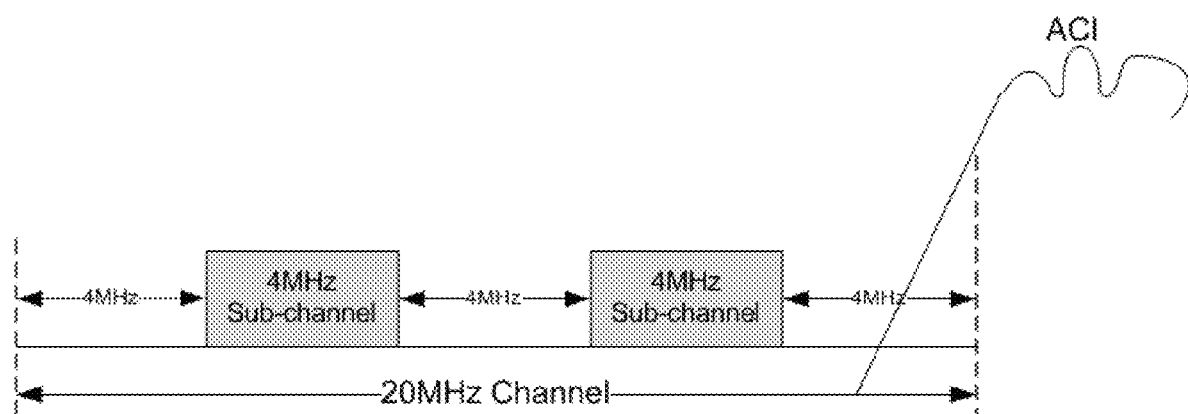

Generally, to achieve a range coverage of the entire WLAN, a WUR preferably operates on a narrow band. For example, a frequency bandwidth for transmitting a wake signal can be 1 MHz, 2 MHz, 4 MHz or 5 MHz. As described below, a frequency channel that is normally allocated for data transmission can be divided into several sub-channels, and selected sub-channels can be used to carry wake-up signals. FIGS. 4A and 4B shows the one or more sub-channels (WUR channels) that can be used for Wake-up signal transmissions in a 20 MHz frequency channel. FIG. 4A shows that a single 4 MHz sub-channel contained in the 20 MHz is used for wake-up signal transmissions with 8 MHz spacing from the ends of the 20 MHz channel. FIG. 4B shows that two 4 MHz channels contained in the 20 MHz are used for wake-up signal transmissions, with a 4 MHz spacing in between. However, it will be appreciated that any reasonable bandwidth can be used to transmit a wake-up signal without departing from the scope of the present disclosure.

Figure 4C:
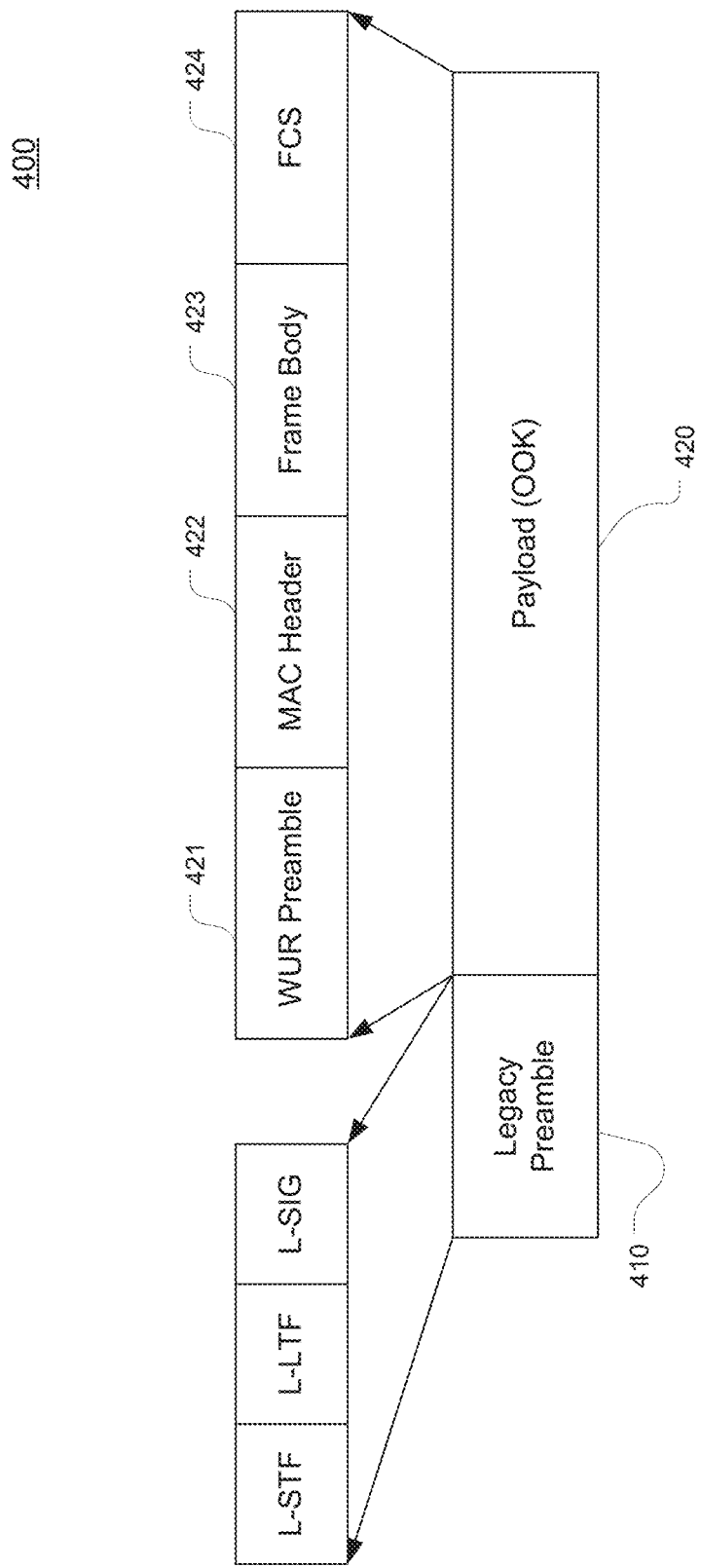
FIG. 4C illustrates the format of an exemplary MU WUR packet transmitted in FDMA in accordance with an embodiment of the present disclosure.

FIG. 4C illustrates the format of an exemplary MU WUR packet transmitted in FDMA in accordance with an embodiment of the present disclosure. The MU wake-up packet 400 includes a legacy preamble 410 and a payload 420 modulated in On/off Key (OOK) modulation. The legacy preamble may serve to spoof legacy devices that are not equipped to process MU wake-up packets, for example because they lack a WUR. The legacy preamble may carry information about the length of the MU WUR packet and notify a legacy device receiving the packet to refrain from transmitting signals during the packet transmission. The legacy device may be a High Throughput (HT) device, a Very High Throughput (VHT) device, and a High Efficient (HE) device as defined in various IEEE 802.11 standards, or any other type of legacy device. The legacy preamble may include a short training field "L-STF," a long training field "L-LTF," and a signaling field "L-SIG."

In addition, the payload 420 may include a WUR preamble 421, a MAC header 422, a frame body 423 including a wake-up frame, and a frame check sequence (FCS) 424. The WUR preamble may contain a signature sequence of wake-up signals, a receive STA ID, a BSS ID, an AP ID, a data portion an optional length portion, and/or any other suitable fields and information. In some embodiments, instead of specific STA IDs, an MU wake-up packet includes a group ID of a group of STAs to identify the receive STAs, e.g., all the STAs in a home network. Well-known fields and information that can be included in MU wake-up signal packets are omitted from the figures and the description for purposes of brevity.

Conventionally, FDMA MU wake-up operations are subject to several constraints which require the used frequency channels to be contiguous. Thus, if there is an indication from the physical layer (PHY) that the secondary 20 MHz is busy or otherwise inaccessible, the AP also cannot transmit wake-up frames to the STAs that have the negotiated WUR channels in the secondary 40 MHz or 80 MHz channel even thought these channels are idle and available. Similar, if there is an indication from the physical layer (PHY) that the secondary 40 MHz is inaccessible, the AP also cannot transmit wake-up frames to the STAs that have the negotiated WUR channels in the secondary 80 MHz channels even thought they are idle and available. Further, if the AP has no pending wake-up frame to an STA that has the negotiated WUR channel in the secondary 20 MHz, the AP also cannot transmit wake-up frames to the STAs having the negotiate WUR channels in the secondary 40 MHz or 80 MHz. If the AP has no pending wake-up frame to an STA that has the negotiated WUR channel in the secondary 40 MHz, the AP also can't transmit wake-up frames to the STAs having the negotiate WUR channels in the secondary 80 MHz.

Figure 5:
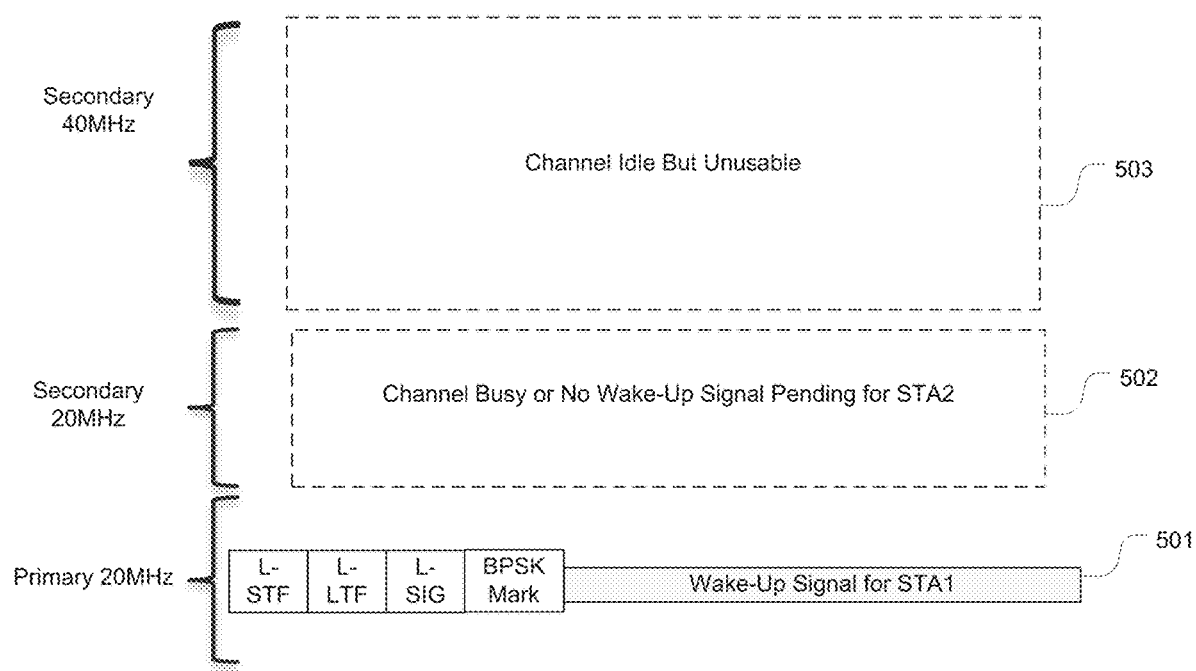
FIG. 5 illustrates the channel usage in a FDMA MU WUR packet transmission in accordance with the prior art.

FIG. 5 illustrates the channel usage in a FDMA MU WUR packet transmission in accordance with the prior art. The 80 MHz frequency band is divided into a primary 20 MHz 501 allocated to STA1, a secondary 20 MHz 502 allocated to STA2, and a secondary 40 MHz 503 channels allocated to STA3 and STA4 (not explicitly shown). As shown in FIGS. 4A and 4C, a WUR channel may be located within each allocated channel. Prior to the FDMA transmission, the AP receives the indication that the secondary 20 MHz is busy or there is no pending wake-up signal for the STA2. Therefore, in the next MU packet transmission, the secondary 20 MHz is unused. This wastes the secondary 40 MHz channel in spite of being idle and having the pending tasks of transmitting wake-up signals to STA3 and STA4.

According to some embodiments of the present disclosure, when a non-primary channel is busy or there is no pending wake-up frame associated therewith, an AP does not transmit any signal in the corresponding WUR channel, but can still transmit the wake-up signals on any other idle channels, or referred as "punctured" FDMA MU wake-up operation herein.

Figure 6A:
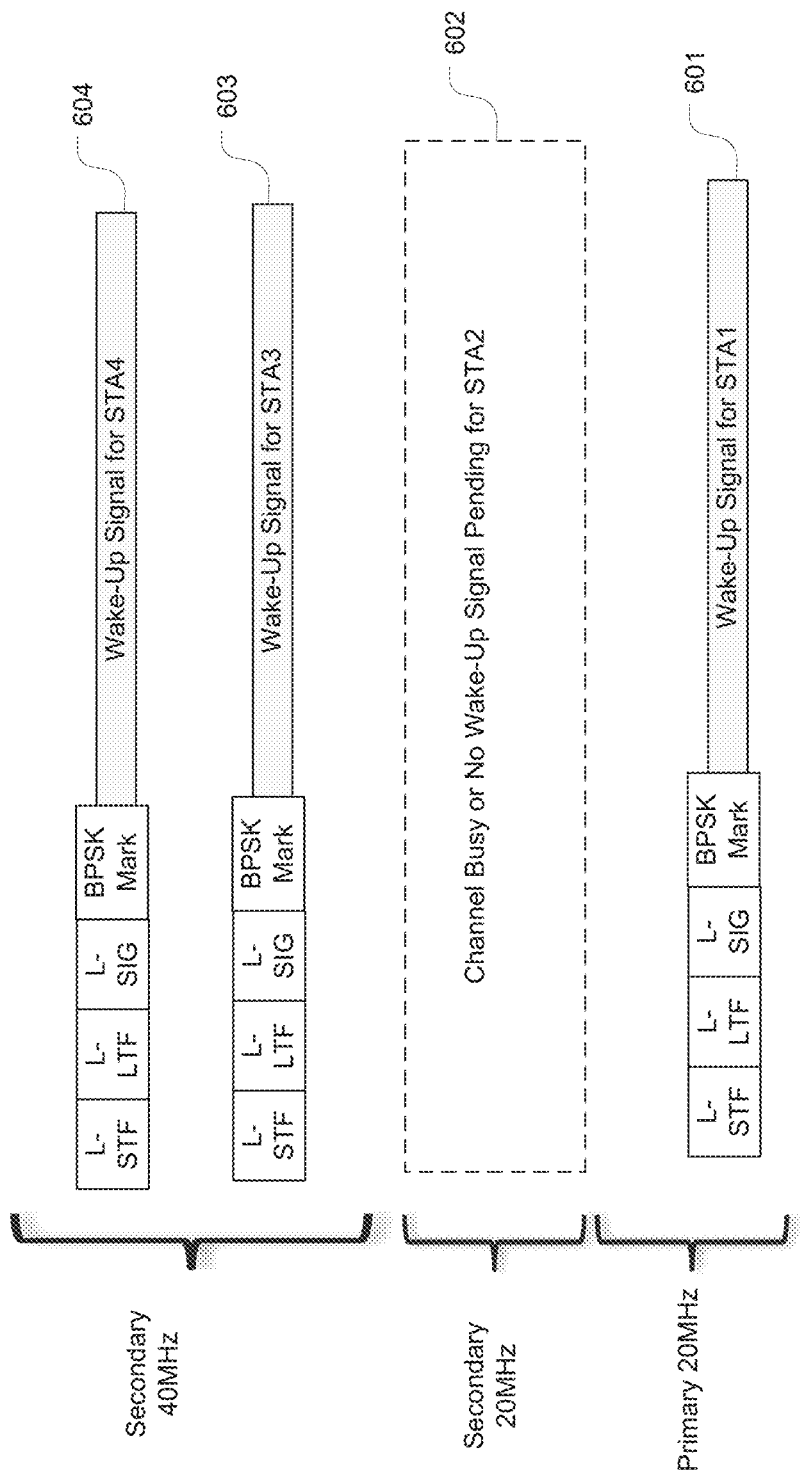
FIG. 6A illustrates the exemplary frequency usage in a punctured FDMA WU wake-up operation in accordance with an embodiment of the present disclosure.
Figure 6B:
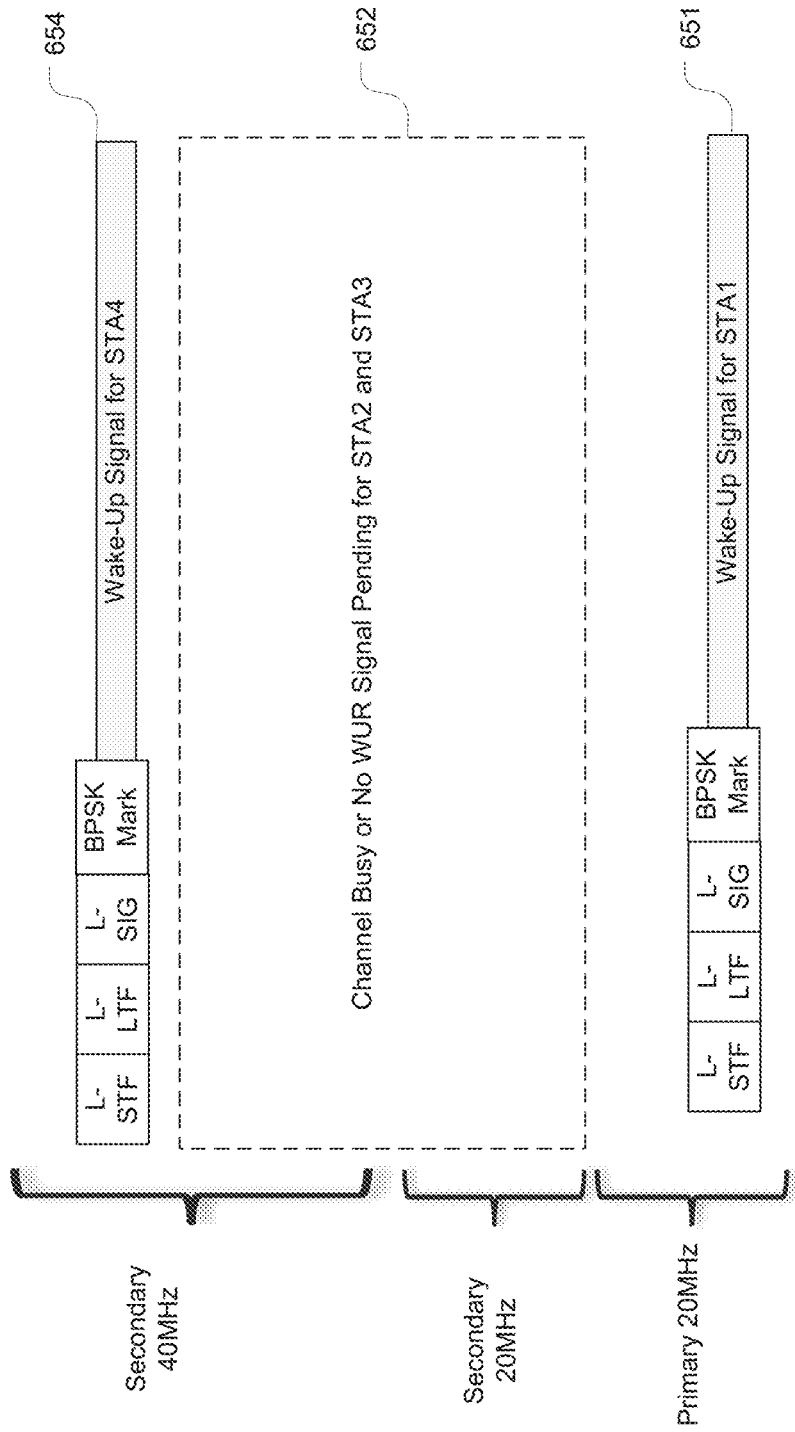
FIG. 6B illustrates the exemplary frequency usage in another punctured FDMA WU wake-up operation in accordance with an embodiment of the present disclosure.

FIG. 6A illustrates the exemplary frequency usage in a punctured FDMA WU wake-up operation in accordance with an embodiment of the present disclosure. Prior to the FDMA transmission, the AP receives the indication that the secondary 20 MHz 602 is busy or there is no pending wake-up signal for the STA2. Therefore, in the FDMA transmission, the secondary 20 MHz 602 is unused. However, the WUR channels 603 and 604 in the secondary 40 MHz are still used for transmitting wake-up signals for STA3 and STA4 despite that they are not contiguous with the primary 20 MHz in the frequency domain. FIG. 6B illustrates the exemplary frequency usage in another punctured FDMA WU wake-up operation in accordance with an embodiment of the present disclosure. In this scenario, the WUR channels 652 allocated to STA 2 and STA3 are busy or there are no pending wake-up frames for them. Therefore, in the FDMA transmission, the WUR channels 652 are unused for any signal, including the secondary 20 MHz and the lower 20 MHz of the secondary 40 MHz. However, the WUR channels 651 for STA1 and 654 for STA4 are used for transmitting wake-up signals.

Figure 7:
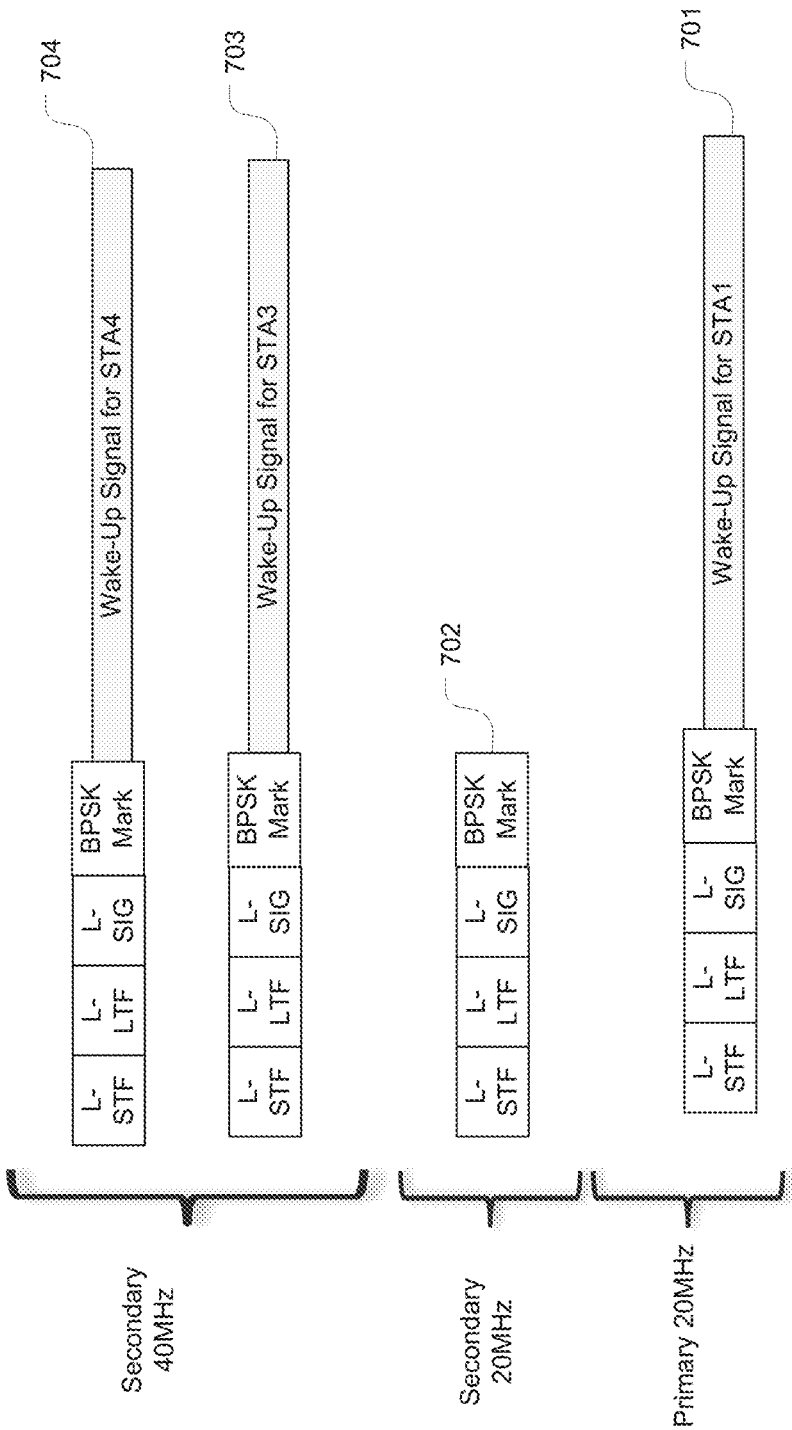
FIG. 7 illustrates the exemplary frequency usage in still another punctured FDMA WU wake-up operation in accordance with an embodiment of the present disclosure.

According to some other embodiments of the present disclosure, when there is no pending wake-up frame for an allocated WUR channel, the AP does not transmit a wake-up signal, but still transmits a legacy preamble, in the WUR channel. FIG. 7 illustrates the exemplary frequency usage in still another punctured FDMA WU wake-up operation in accordance with an embodiment of the present disclosure. In this scenario, the WUR channel 702 is not busy but there is no pending frame for the STA2. The AP transmits the wake-up signals following the legacy preambles in the WUR channels 701, 703 and 704 allocated for STA1, STA2 and STA3, respectively. The WUR channel allocated to STA2 is used to transmit the legacy preamble which is not followed by any wake-up signal.

Figure 8A:
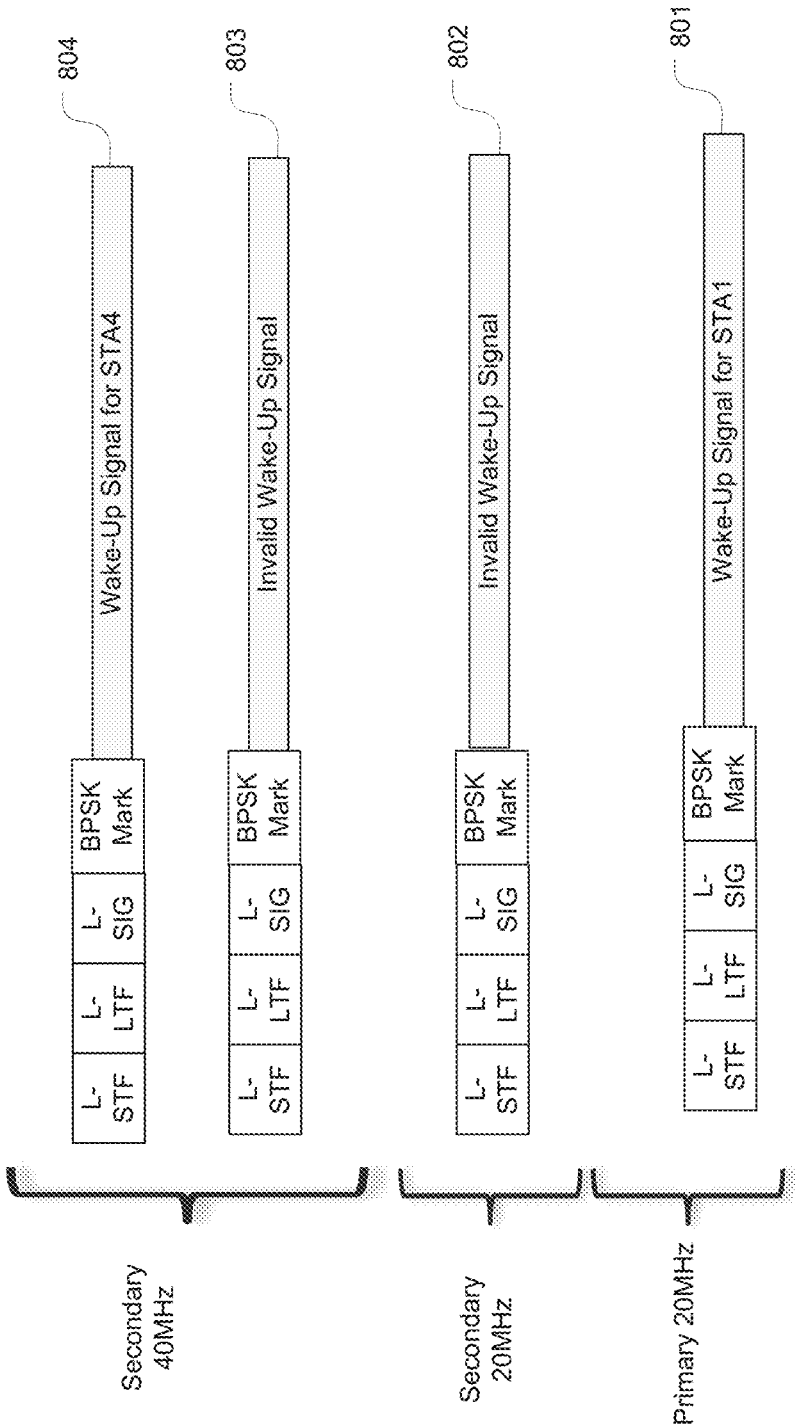
FIG. 8A illustrates the exemplary frequency usage in a FDMA WU wake-up operation with an invalid wake-up signal transmitted in a WUR channel in accordance with an embodiment of the present disclosure.

According to some other embodiments of the present disclosure, when there is no pending wake-up frame for an allocated WUR channel, the AP does not transmit a wake-up signal, but instead transmits a legacy preamble followed by an invalid wake-up signal in the WUR channel. FIG. 8A illustrates the exemplary frequency usage in a FDMA WU wake-up operation with an invalid wake-up signal transmitted in a WUR channel in accordance with an embodiment of the present disclosure. In this scenario, the channels 802 and 803 are not busy but there are no pending wake-up frames for STA2 or STA3. The AP transmits the wake-up signals following the legacy preambles in the WUR channels 801 and 804 allocated for STA1, and STA4, respectively. The WUR channels allocated to STA2 and STA3 are used to transmit an invalid wake-up signal as well as the legacy preambles. An invalid wake-up signal can be any signal that does not wake up the corresponding main radios, such as wake-up beacon frame or a wake-up discovery frame.

Figure 8B:
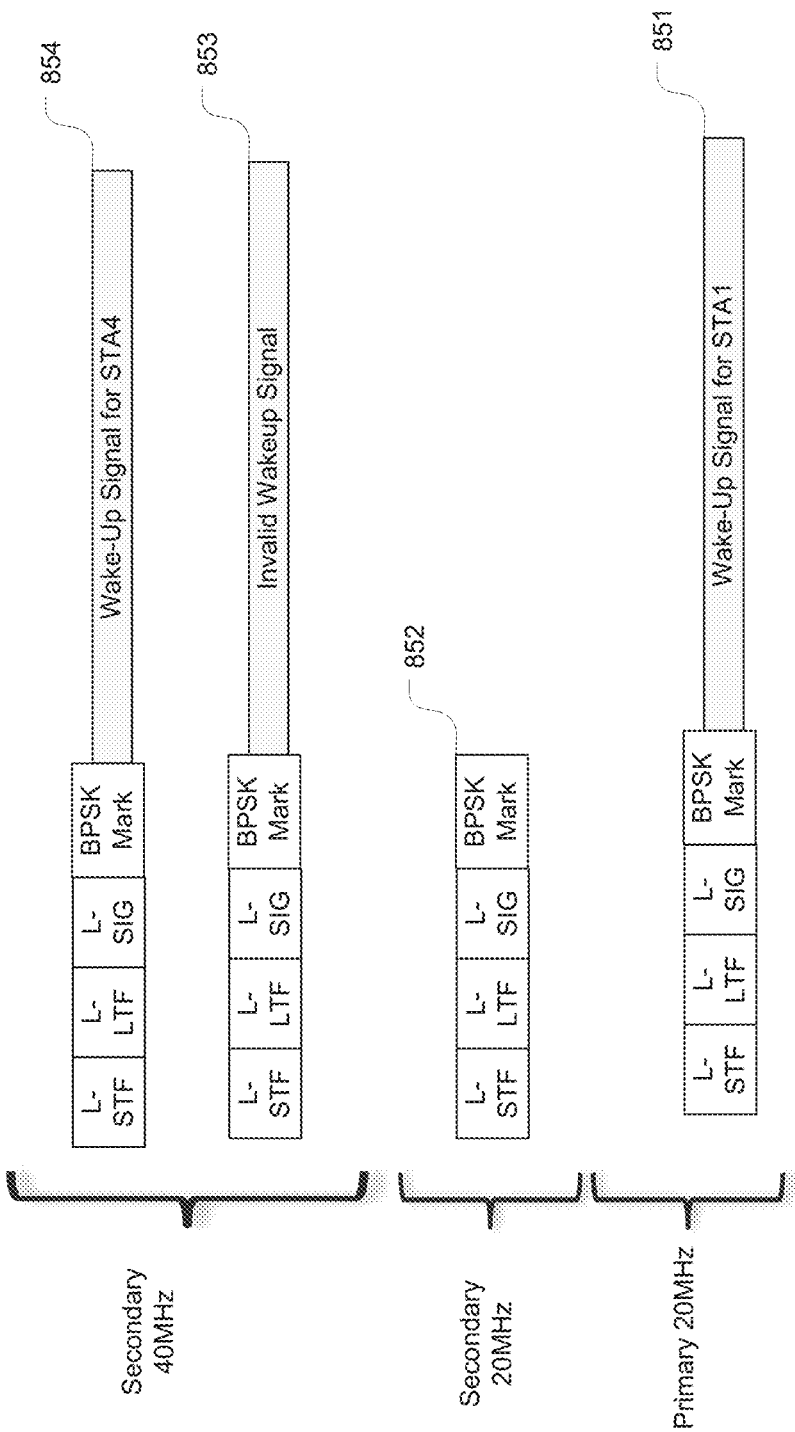
FIG. 8B illustrates an exemplary frequency usage in an FDMA MU wake-up operation that combines the puncture scheme and the invalid signal scheme in accordance with an embodiment of the present disclosure.

This mechanism also applies to the scenario that the WUR primary channel has no pending wake-up frame. Thus, the WUR channel in the primary 20 MHz can carry an invalid signal while any other WUR channels that are accessible and have pending wake-up frames can be used to carry the wake-up signals. FIG. 8B illustrates an exemplary frequency usage in an FDMA MU wake-up operation that combines the puncture scheme and the invalid signal scheme in accordance with an embodiment of the present disclosure. The WUR channels 851 and 854 carry the wake-up signals for STA 1 and STA4, respectively. The WUR channel 852 in the secondary 20 MHz carries a legacy preamble destined to STA2 without a wake-up signal. The WUR channel 853 in the lower 20 MHz of the secondary 40 MHz carries a legacy preamble as well as an invalid wake-up signal. In a different combination, if the WUR channel 852 is inaccessible, it remains unused and the WUR channel 853 carries an invalid signal in the FDMA MU wake-up operation.

Figure 9:
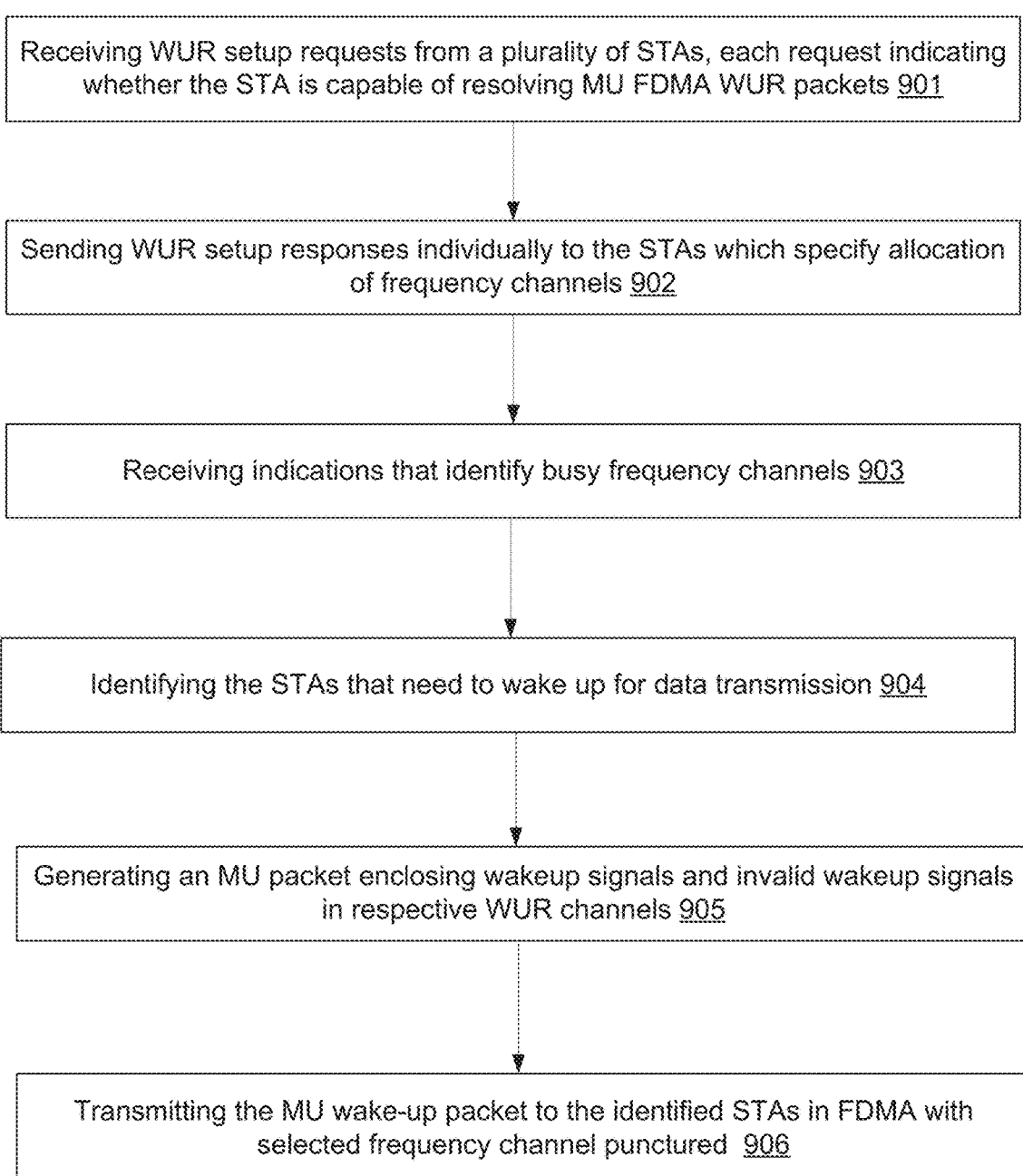
FIG. 9 is a flow chart depicting an exemplary process of executing an FDMA WUR operation in accordance with an embodiment of the present disclosure.

FIG. 9 is a flow chart depicting an exemplary process 900 of executing an FDMA WUR operation in accordance with an embodiment of the present disclosure. Process 900 may be performed by an AP device. At 901, the AP receives WUR setup requests from a plurality of STAs, each request indicating whether the STA is capable of resolving MU FDMA WUR packets or whether it has the WUR channel switching capability. At 902, the AP sends WUR setup responses individually to the STAs which specify allocation of WUR channels, e.g., in the form frequency offset. At 903, the AP receives one or more indications that identify one or more busy frequency channels. At 904, the AP identifies the STAs that have wake-up signals pending, e.g., based on their respective negotiated duty cycles. At 905, the AP generates a MU wake-up packet enclosing the wake-up signals and invalid wake up signals in respective WUR channels, as described in greater detail with reference to FIG. 6A~FIG. 8. At 906, the AP transmits the MU wake-up packet to the plurality of STAs in FDMA, while some WUR channels may be punctured, as described in greater detail with reference to FIG. 6A~FIG. 8.

Figure 10:
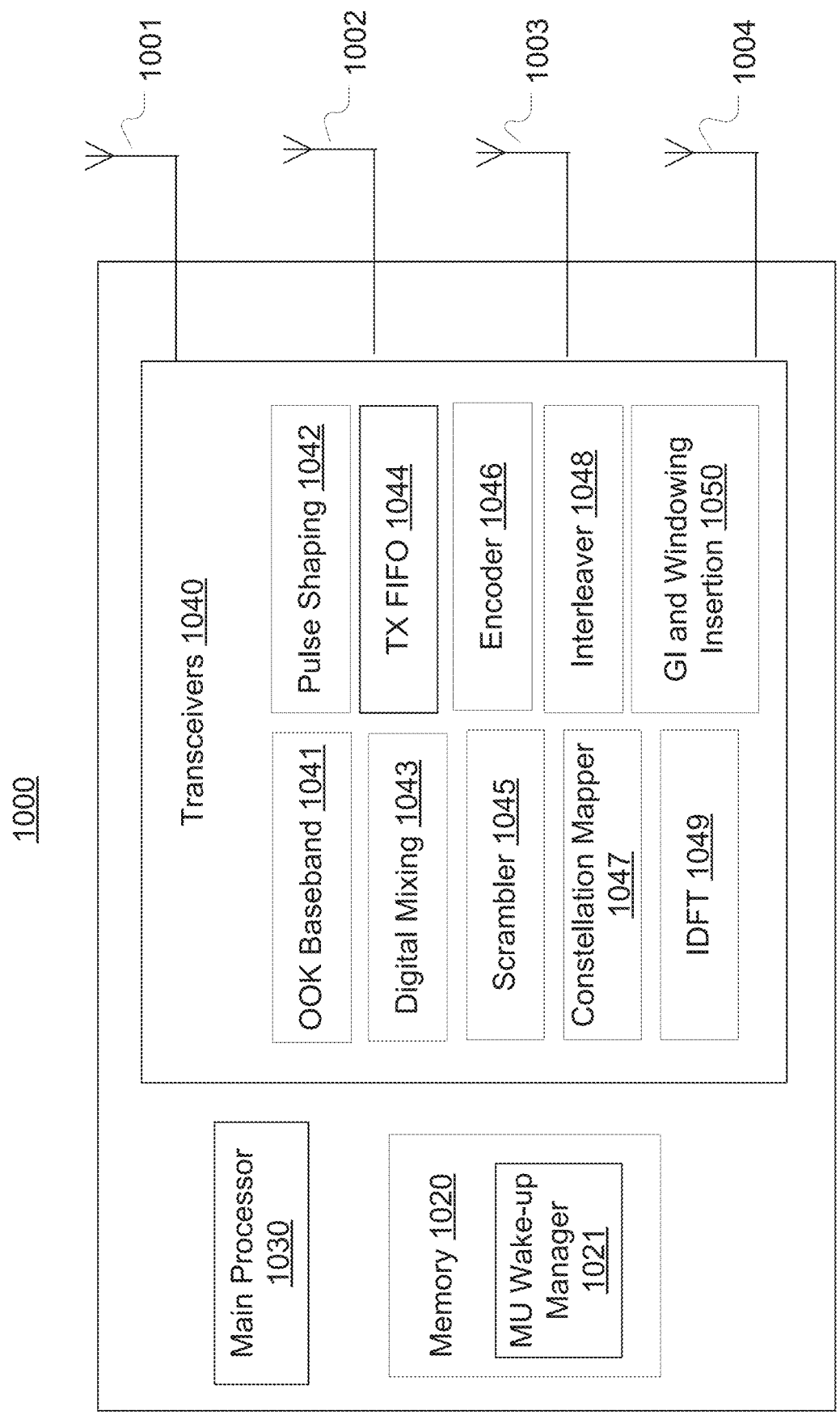
FIG. 10 is a block diagram illustrating an exemplary wireless communication device 1000 capable of generating and transmitting MU wake-up packets in accordance with an embodiment of the present disclosure.

FIG. 10 is a block diagram illustrating an exemplary wireless communication device 1000 capable of generating and transmitting MU wake-up packets in accordance with an embodiment of the present disclosure. The communication device 1000 may be an AP, a repeater, or a non-AP device, having a transceiver configured for data communication, e.g., a general purpose computer, a smart phone, a tablet wearable device, a sensor used on Internet of Things (IoT), and etc.

The device 1000 includes a main processor 1030, a memory 1020 and a transceiver 440 coupled to an array of antenna 1001-1004. The memory 1020 includes a wake-up manger 1021 that stores processor-executable instructions for generating wake-up signals as well as configurations of other parts of MU wake-up packets, as described in greater detail with reference to FIGS. 1-8A. The wake-up manager 1021 also stores other information related to wake-up packet generation and management, such as the STA IDs, STA group IDs, sleep protocols of the main radios and WURs of the STAs, negotiation protocols, frequency sub-channels allocation to the respective WURs, MU wake-up packet formats, and so on. In some other embodiments, the wake-up manager 1021 is stored in a memory within the transceiver 1040.

The transceiver 1040 includes an OOK baseband module 1041, a pulse shaping module 1042 and digital mixing module 1043 which operate to generate OOK wake-up signals for transmission in FDMA. However, any other well known suitable modulation mechanisms can be used without departing from the scope of the present disclosure. The transceiver 1040 further includes various modules of the transmit path which is configured to generate each section of an MU wake-up packet or data packet or any other type of communication transmission units. For instance, it has a transmit First-In-First-Out (TX FIFO) 1044, an encoder 1046, a scrambler 413, an interleaver 1048 a constellation mapper 1047, an inversed discrete Fourier transformer (IDFT) 1049, and a GI and windowing insertion module 1050.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, the method comprising:
   receiving a first frame from a first station (STA), wherein the first frame comprises an indication that the first STA is operable to resolve a multi-user (MU) WUR packet transmitted in Frequency-Division Multiple Access (FDMA);
   sending a second frame to the first STA, wherein the second frame specifies a channel offset relative to a primary channel of a frequency band and wherein the channel offset corresponds to a first frequency channel comprised in the frequency band; and
   transmitting a MU WUR packet to a plurality of STAs comprising the first STA by using FDMA, wherein the MU WUR packet comprises a plurality of wake-up signals transmitted using different frequency channels comprised in the frequency band, and wherein a first wake-up signal transmitted in the first frequency channel.

2. The method of claim 1, further comprising:
   receiving a third frame from a second STA; and
   sending a fourth frame to the second STA, wherein the fourth frame allocates a second frequency channel for transmitting a second wake-up signal to the second STA, and
   wherein the transmitting the MU WUR packet further comprises, in response to an indication that the second frequency channel is busy or a determination that no wake-up signal is pending for transmission to the second STA, transmitting the MU WUR packet without using the second frequency channel and without any wake-up signal directed to the second STA.

3. The method of claim 2, wherein the first and second frequency channels are non-primary channels of the frequency band, and wherein further the second frequency channel is disposed in frequency between the first frequency channel and the primary channel.

4. The method of claim 1, further comprising:
   in response to a third frame from a second STA, sending a second WUR setup response to the second STA, wherein the second WUR setup response allocates a second frequency channel to be used for transmitting a second wake-up signal to the second STA, and
   wherein the transmitting the MU WUR packet further comprises, in response to an indication that the second frequency channel is busy, transmitting a preamble using the second frequency channel and without transmitting any wake-up signal in the second frequency channel, and wherein further the second frequency channel is disposed in frequency between the first frequency channel and the primary channel.

5. The method of claim 1, further comprising:
   in response to a third frame from a second STA, sending a second WUR setup response to the second STA, wherein the second WUR setup response allocates a second frequency channel to be used for transmitting a second wake-up signal to the second STA, and
   wherein the transmitting the MU WUR packet further comprises, in response to a determination that no wake-up signal is pending for transmission to the second STA, transmitting an invalid wake-up signal by using the second frequency channel and without any wake-up signal directed to the second STA, wherein the invalid wake-up signal is inoperable to activate the second STA.

6. The method of claim 5, wherein the invalid wake-up signal is one of: a wake-up beacon frame; and a wake-up discovery frame.

7. The method of claim 5, wherein the second frequency channel is the primary channel.

8. The method of claim 1, further comprising periodically transmitting beacon frames to the plurality of STAs using a second frequency channel that is different from the first frequency channel.

9. A method of wireless communication, the method comprising,
   receiving wake-up Radio (WUR) setup requests from a plurality of stations (STAs) comprising a first STA and a second STA;
   in response to the WUR setup requests, sending a WUR setup response to the plurality of STAs to allocate a respective frequency channel comprised in a frequency band for transmitting a respective wake-up signal; and
   transmitting a Multi-User (MU) WUR packet comprising a plurality of wake-up signals in Frequency-Division Multiple Access (FDMA) using allocated frequency channels comprised in the WUR setup response, wherein a wake-up signal transmitted in a frequency channel allocated to the second STA for waking the second STA.

10. The method described in claim 9, further comprising receiving an indication that a frequency channel allocated to the first STA is busy, wherein the MU WUR packet does not include a wake-up signal transmitted in the frequency channel for waking the first STA.

11. The method described in claim 9, further comprising receiving an indication that no wake-up signal is pending for transmission to the first STA, wherein the MU WUR packet does not include a wake-up signal transmitted in a frequency channel allocated to the first STA for waking the first STA.

12. The method of claim 9, wherein the transmitting the MU WUR packet in FDMA is performed without transmitting any signal in a frequency channel allocated to the first STA for waking the first STA.

13. The method of claim 9, wherein the transmitting the MU WUR packet in FDMA comprises transmitting an invalid wake-up signal in the frequency channel.

14. The method of claim 9, wherein the transmitting the MU WUR packet in FDMA comprises: transmitting, in the frequency channel, a preamble; and not transmitting any payload following the preamble.

15. A wireless communication station comprising:
   a memory;
   a processor coupled to the memory; and a transceiver coupled to the processor, wherein the transceiver is configured to:
  receive a first frame from a first station (STA), wherein the first frame comprises an indication that the first STA is operable to resolve a multi-user (MU) WUR packet transmitted in Frequency-Division Multiple Access (FDMA);
  send a second frame to the first STA, wherein the second frame specifies a channel offset relative to a primary channel of a frequency band and the channel offset corresponds to a first frequency channel comprised in the frequency band; and
  transmit a MU WUR packet to a plurality of STAs comprising the first STA by using FDMA, wherein the MU WUR packet comprises a plurality of wake-up signals transmitted using different frequency channels comprised in the frequency band, wherein a first wake-up signal transmitted in the first frequency channel.

16. The wireless communication station of claim 15, wherein the transceiver is further configured to:
  receive a second WUR setup request from a second STA; and
  transmit a second WUR setup response to the second STA, wherein the second WUR setup response allocates a second frequency channel for transmitting a second wake-up signal to the second STA, and
  wherein the transmit the MU WUR packet further comprises said transceiver configured to, in response to an indication that the second frequency channel is busy or a determination that no wake-up signal is pending for transmission to the second STA, transmit the MU WUR packet without using the second frequency channel and without any wake-up signal directed to the second STA.

17. The wireless communication station of claim 16, wherein the first and second frequency channels are non-primary channels of the frequency band, and wherein further the second frequency channel is disposed between the first frequency channel and the primary channel.

18. The wireless communication station of claim 15, wherein the transceiver is further configured to:
  in response to a second WUR setup request from a second STA, transmit a second WUR setup response to the second STA, wherein the second WUR setup response allocates a second frequency channel to be used for transmitting a second wake-up signal to the second STA, and
  wherein the to transmit the MU WUR packet further comprises, in response to a determination that no wake-up signal is pending for transmission to the second STA, transmitting an invalid wake-up signal using the second frequency channel and without any wake-up signal directed to the second STA, wherein the invalid wake-up signal is inoperable to activate the second STA.

19. The wireless communication station of claim 18, wherein the invalid wake-up signal is one of: a wake-up beacon frame; and a wake-up discovery frame.

20. The wireless communication station of claim 18, wherein the second frequency channel is the primary channel.

* * * * *